US009129097B2

(12) United States Patent
Etchegoyen

(10) Patent No.: US 9,129,097 B2
(45) Date of Patent: Sep. 8, 2015

(54) SYSTEMS AND METHODS FOR AUDITING SOFTWARE USAGE USING A COVERT KEY

(75) Inventor: Craig Stephen Etchegoyen, Irvine, CA (US)

(73) Assignee: Uniloc Luxembourg S.A., Luxembourg (LU)

( * ) Notice: Subject to any disclaimer, the term of this patent is extended or adjusted under 35 U.S.C. 154(b) by 914 days.

(21) Appl. No.: 12/818,934

(22) Filed: Jun. 18, 2010

(65) Prior Publication Data

US 2010/0333207 A1 Dec. 30, 2010

Related U.S. Application Data

(60) Provisional application No. 61/220,085, filed on Jun. 24, 2009.

(51) Int. Cl.
| | | |
|---|---|---|
| *G06F 7/04* | (2006.01) | |
| *G06F 17/30* | (2006.01) | |
| *H04N 7/16* | (2011.01) | |
| *G06F 21/12* | (2013.01) | |
| *G06F 21/10* | (2013.01) | |
| *H04L 9/32* | (2006.01) | |
| *G06F 9/00* | (2006.01) | |

(52) U.S. Cl.
CPC .............. *G06F 21/121* (2013.01); *G06F 21/10* (2013.01); *G06F 9/00* (2013.01); *G06F 21/105* (2013.01); *G06F 21/12* (2013.01); *H04L 9/3242* (2013.01)

(58) Field of Classification Search
CPC ....... G06F 21/10; G06F 21/105; G06F 21/12; G06F 21/121; G06F 9/00; H04L 2463/103; H04L 9/3242
See application file for complete search history.

(56) References Cited

U.S. PATENT DOCUMENTS

| | | | |
|---|---|---|---|
| 4,351,982 A | 9/1982 | Miller et al. | |
| 4,658,093 A | 4/1987 | Hellman | |

(Continued)

FOREIGN PATENT DOCUMENTS

| | | |
|---|---|---|
| AU | 678985 | 6/1997 |
| EP | 1637958 | 3/2006 |

(Continued)

OTHER PUBLICATIONS

Williams, R., "A Painless Guide to CRC Error Detection Algorithms", Ver. 3, Aug. 19, 1993.

(Continued)

*Primary Examiner* — Jeffrey Pwu
*Assistant Examiner* — Jayesh Jhaveri
(74) *Attorney, Agent, or Firm* — Sean D. Burdick

(57) ABSTRACT

System and method for auditing for usage of licensed software in which a client executing the software generates and transmits a license key and a covert key to a server via network connection. The license key is transmitted to the server upon activation of the licensed software at the client. The covert key is generated based on at least a portion of the software code activated at the client and is transmitted to the server at random or at predetermined time intervals after transmission of the licensed key so as to avoid detection by a user. The license and covert keys are each associated with a device fingerprint that uniquely identifies the device transmitting each one of the respective keys. Unauthorized software usage at a client is determined at least when a covert key does not correspond to a device fingerprint having an associated license key.

10 Claims, 4 Drawing Sheets

(56) References Cited

U.S. PATENT DOCUMENTS

| | | | |
|---|---|---|---|
| 4,704,610 A | 11/1987 | Smith et al. | |
| 4,796,220 A | 1/1989 | Wolfe | |
| 5,210,795 A | 5/1993 | Lipner et al. | |
| 5,291,598 A | 3/1994 | Grundy | |
| 5,414,269 A | 5/1995 | Takahashi | |
| 5,418,854 A | 5/1995 | Kaufman et al. | |
| 5,440,635 A | 8/1995 | Bellovin et al. | |
| 5,483,658 A * | 1/1996 | Grube et al. | 726/29 |
| 5,490,216 A | 2/1996 | Richardson, III | |
| 5,509,070 A | 4/1996 | Schull | |
| 5,666,415 A | 9/1997 | Kaufman | |
| 5,745,879 A | 4/1998 | Wyman | |
| 5,754,763 A | 5/1998 | Bereiter | |
| 5,790,664 A | 8/1998 | Coley et al. | |
| 5,925,127 A | 7/1999 | Ahmad | |
| 5,974,150 A | 10/1999 | Kaish et al. | |
| 6,009,401 A * | 12/1999 | Horstmann | 705/317 |
| 6,044,471 A | 3/2000 | Colvin | |
| 6,134,659 A | 10/2000 | Sprong et al. | |
| 6,158,005 A | 12/2000 | Bharathan et al. | |
| 6,230,199 B1 | 5/2001 | Revashetti et al. | |
| 6,233,567 B1 | 5/2001 | Cohen | |
| 6,243,468 B1 | 6/2001 | Pearce et al. | |
| 6,294,793 B1 | 9/2001 | Brunfeld et al. | |
| 6,330,670 B1 | 12/2001 | England et al. | |
| 6,449,645 B1 | 9/2002 | Nash | |
| 6,536,005 B1 | 3/2003 | Augarten | |
| 6,697,948 B1 | 2/2004 | Rabin et al. | |
| 6,782,350 B1 | 8/2004 | Burnley et al. | |
| 6,785,825 B2 | 8/2004 | Colvin | |
| 6,859,793 B1 | 2/2005 | Lambiase | |
| 6,920,567 B1 | 7/2005 | Doherty et al. | |
| 6,976,009 B2 | 12/2005 | Tadayon et al. | |
| 7,032,110 B1 | 4/2006 | Su et al. | |
| 7,069,440 B2 | 6/2006 | Aull | |
| 7,069,595 B2 | 6/2006 | Cognigni et al. | |
| 7,085,741 B2 | 8/2006 | Lao et al. | |
| 7,131,144 B2 * | 10/2006 | Rabin et al. | 726/30 |
| 7,188,241 B2 | 3/2007 | Cronce et al. | |
| 7,203,966 B2 | 4/2007 | Abburi et al. | |
| 7,206,765 B2 | 4/2007 | Gilliam et al. | |
| 7,228,567 B2 * | 6/2007 | Serkowski et al. | 726/30 |
| 7,272,728 B2 | 9/2007 | Pierson et al. | |
| 7,313,828 B2 * | 12/2007 | Holopainen | 726/29 |
| 7,319,987 B1 | 1/2008 | Hoffman et al. | |
| 7,327,280 B2 | 2/2008 | Bachelder et al. | |
| 7,337,147 B2 | 2/2008 | Chen et al. | |
| 7,343,297 B2 | 3/2008 | Bergler et al. | |
| 7,463,945 B2 | 12/2008 | Kiesel et al. | |
| 7,644,442 B2 | 1/2010 | Miller et al. | |
| 7,653,899 B1 | 1/2010 | Lindahl et al. | |
| 7,805,616 B1 * | 9/2010 | Mohammed et al. | 713/189 |
| 2001/0034712 A1 * | 10/2001 | Colvin | 705/52 |
| 2001/0044782 A1 | 11/2001 | Hughes et al. | |
| 2002/0019814 A1 | 2/2002 | Ganesan | |
| 2002/0082997 A1 | 6/2002 | Kobata et al. | |
| 2002/0161636 A1 | 10/2002 | Takahashi et al. | |
| 2002/0161718 A1 | 10/2002 | Coley et al. | |
| 2003/0065918 A1 | 4/2003 | Willey | |
| 2003/0149670 A1 * | 8/2003 | Cronce | 705/59 |
| 2003/0154387 A1 * | 8/2003 | Evans et al. | 713/193 |
| 2003/0172035 A1 | 9/2003 | Cronce et al. | |
| 2004/0024860 A1 | 2/2004 | Sato et al. | |
| 2004/0030912 A1 | 2/2004 | Merkle et al. | |
| 2004/0059929 A1 | 3/2004 | Rodgers et al. | |
| 2004/0143746 A1 | 7/2004 | Ligeti et al. | |
| 2004/0187018 A1 | 9/2004 | Owen et al. | |
| 2004/0263911 A1 | 12/2004 | Rodriguez et al. | |
| 2005/0108173 A1 | 5/2005 | Stefik et al. | |
| 2005/0138155 A1 | 6/2005 | Lewis | |
| 2005/0172280 A1 | 8/2005 | Ziegler et al. | |
| 2005/0273600 A1 | 12/2005 | Seeman | |
| 2006/0059097 A1 | 3/2006 | Kent | |
| 2006/0072444 A1 | 4/2006 | Engel et al. | |
| 2006/0095396 A1 | 5/2006 | Ostrover | |
| 2006/0095454 A1 | 5/2006 | Shankar et al. | |
| 2006/0161914 A1 | 7/2006 | Morrison et al. | |
| 2006/0174346 A1 * | 8/2006 | Carroll et al. | 726/26 |
| 2006/0265337 A1 | 11/2006 | Wesinger, Jr. | |
| 2006/0282511 A1 | 12/2006 | Takano et al. | |
| 2007/0150418 A1 * | 6/2007 | Ben-Menahem et al. | 705/59 |
| 2007/0162395 A1 | 7/2007 | Ben-Yaacov et al. | |
| 2007/0168288 A1 | 7/2007 | Bozeman | |
| 2007/0198422 A1 | 8/2007 | Prahlad et al. | |
| 2007/0203846 A1 | 8/2007 | Kavuri et al. | |
| 2007/0219917 A1 | 9/2007 | Liu et al. | |
| 2007/0234427 A1 | 10/2007 | Gardner et al. | |
| 2007/0282615 A1 | 12/2007 | Hamilton et al. | |
| 2008/0065552 A1 | 3/2008 | Elazar et al. | |
| 2008/0086423 A1 | 4/2008 | Waites | |
| 2008/0098471 A1 * | 4/2008 | Ooi et al. | 726/9 |
| 2008/0141378 A1 | 6/2008 | McLean | |
| 2008/0147556 A1 | 6/2008 | Smith et al. | |
| 2008/0228578 A1 | 9/2008 | Mashinsky | |
| 2008/0247731 A1 | 10/2008 | Yamauchi et al. | |
| 2008/0285758 A1 * | 11/2008 | Chuprov et al. | 380/278 |
| 2008/0289050 A1 | 11/2008 | Kawamoto et al. | |
| 2008/0320607 A1 * | 12/2008 | Richardson | 726/33 |
| 2009/0024984 A1 * | 1/2009 | Maeda | 717/121 |
| 2009/0083730 A1 | 3/2009 | Richardson | |
| 2009/0138975 A1 | 5/2009 | Richardson | |
| 2009/0165080 A1 | 6/2009 | Fahn et al. | |
| 2009/0204661 A1 | 8/2009 | Endo et al. | |
| 2009/0228982 A1 * | 9/2009 | Kobayashi | 726/26 |
| 2010/0057703 A1 * | 3/2010 | Brandt et al. | 707/4 |
| 2012/0110342 A1 * | 5/2012 | Agrawal et al. | 713/189 |

FOREIGN PATENT DOCUMENTS

| | | |
|---|---|---|
| EP | 1637961 | 3/2006 |
| EP | 1670188 | 6/2006 |
| WO | WO 9220022 | 11/1992 |
| WO | WO 9301550 | 1/1993 |
| WO | WO 9535533 | 12/1995 |
| WO | WO 0067095 | 11/2000 |
| WO | WO 2005104686 | 11/2005 |
| WO | WO2007060516 | 5/2007 |
| WO | WO2008013504 | 1/2008 |
| WO | WO2008157639 | 12/2008 |
| WO | WO2009039504 | 3/2009 |
| WO | WO2009065135 | 5/2009 |
| WO | WO2009076232 | 6/2009 |
| WO | WO2009105702 | 8/2009 |
| WO | WO2009143115 | 11/2009 |
| WO | WO 2009158525 | 12/2009 |
| WO | WO 2010/093683 | 8/2010 |

OTHER PUBLICATIONS

Angha, F. et al., "Securing Transportation Network Infrastructure with Patented Technology of Device Locking—Developed by Uniloc USA", avail. at: http://www.dksassociates.com/admin/paperfile/ITS%20World%20Paper%20Submission_Uniloc%20_2_.pdf, Oct. 24, 2006.

Econolite, "Econolite and Uniloc Partner to Bring Unmatched Infrastructure Security to Advanced Traffic Control Networks with Launch of Strongpoint", avail. at: http://www.econolite.com/docs/press/20080304_Econolite_StrongPoint.pdf, Mar. 4, 2008.

Luo et al. "Ariadne: An Eclipse-based System for Tracking the Originality of Source Code," *IBM Systems Journal*, 2007, vol. 46, No. 2, pp. 289-303.

Wikipedia: "Software Extension," May 28, 2009, Internet Article retrieved on Oct. 11, 2010. XP002604710.

H. Williams, et al., "Web Database Applications with PHP & MySQL", Chapter 1, "Database Applications and the Web", ISBN 0-596-00041-3, O'Reilly & Associates, Inc., Mar. 2002, avail. at: http://docstore.mik.ua/orelly/webprog/webdb/ch01_01.htm. XP002603488.

* cited by examiner

SYSTEMS AND METHODS FOR AUDITING SOFTWARE USAGE USING A COVERT KEY

This application claims priority to U.S. Provisional Application 61/220,085, which was filed Jun. 24, 2009, and which is fully incorporated herein by reference.

BACKGROUND OF THE INVENTION

1. Field of the Invention

The present disclosure relates to systems and methods for auditing software usage and, more particularly, to auditing software usage using a covert key.

2. Description of the Related Art

Despite substantial advances in technology, software piracy remains a significant threat to software developers and publishers. The increase in broadband Internet access, sprawling geographies and weak institutional infrastructure are among many factors which contribute to the growing use of unlicensed or pirated software. Moreover, it is often difficult to ascertain whether or not a given install or use of software may be properly licensed.

The most common method of sleuthing out pirated or unlicensed software usage is to conduct a software audit. Software audits typically involve simply comparing the number of software licenses purchased by an individual or organization with the actual number of copies of software installed and/or utilized. Software audits are typically conducted by software publishers or third-party entities specializing in conducting such audits.

There are some significant disadvantages associated with software audits. Software audits typically require significant investment of human capital and time. Moreover, software audits are rarely successful in uncovering all unlicensed and pirated uses of software. Thus, what is needed is a more efficient and effective means for conducting software audits.

SUMMARY

The systems and methods described herein provide an improved means for auditing software by utilizing two sets of keys. The first key is a license key that is used during product unlocking or activation and is preferably unique per license or purchase. The second key is the covert key and is unique for a given product, across all licenses.

The client device on which the software is installed sends a license key to an authorization server upon the software being unlocked. The license key is associated with a device fingerprint that uniquely identifies the client device on which the software has been unlocked.

Subsequent to the sending of the license key, a covert key is generated at the client device based on a portion of the software that was unlocked by the license key. This covert key is sent to the authorization server and is also associated with the device fingerprint. Preferably, to avoid detection or observation during unlocking, the covert key is sent to the authorization server after a random interval of time after the sending of the license key and also on a random percent chance basis.

Unauthorized software usage at a client is determined at least when a covert key is not found to correspond to a device fingerprint having an associated license key. Thus if a covert key/device fingerprint pair exists without a license key/device fingerprint pair, where the device fingerprints are the same, this can be considered a pirated activation because the unlocked portion of the software code was executed without the license key code having been executed.

In one embodiment, a system for auditing software usage is described. The system comprises a network interface disposed to receive a device fingerprint associated with a covert key. A memory holds program instructions operable for accessing a database storing a plurality of previously received device fingerprints associated with license keys and determining whether the device fingerprint associated with the covert key corresponds to any one of the plurality of previously received device fingerprints associated with license keys. The system further comprises a processor, in communication with the network interface and the memory, configured for operating the program instructions.

In another embodiment, a method for auditing software usage is described. The method comprises receiving a device fingerprint associated with a covert key, accessing a database storing a plurality of previously received device fingerprints associated with license keys, and determining whether the device fingerprint associated with the covert key corresponds to any one of the plurality of previously received device fingerprints associated with license keys.

In a further embodiment, a method for auditing software usage at a client device is described. The method comprises sending, from the client device, an identifier for the software installed on the client device and a device fingerprint uniquely identifying the client device to an authorization server; receiving a license key operable to unlock at least a portion of the software for use at the client device; generating a covert key based on at least a portion of the software that unlocked by the license key; and sending the covert key and the device fingerprint to the authorization server.

In yet a further embodiment, tangible computer-readable media are provided having stored thereon, computer-executable instructions that, if executed by a client device, cause the client device to perform the methods disclosed herein. Server-side and client-side applications are separately provided.

A more complete understanding of methods and systems disclosed herein will be afforded to those skilled in the art, as well as a realization of additional advantages and objects thereof, by a consideration of the following detailed description. Reference will be made to the appended sheets of drawings which will first be described briefly.

BRIEF DESCRIPTION OF THE DRAWINGS

In the drawings, wherein like reference numerals refer to similar components.

Other objects, features and advantages of the present invention will become apparent to those skilled in the art from the following detailed description.

DETAILED DESCRIPTION

A more complete appreciation of the disclosure and many of the attendant advantages will be readily obtained, as the same becomes better understood by reference to the following detailed description of the exemplary embodiments.

Figure 1:
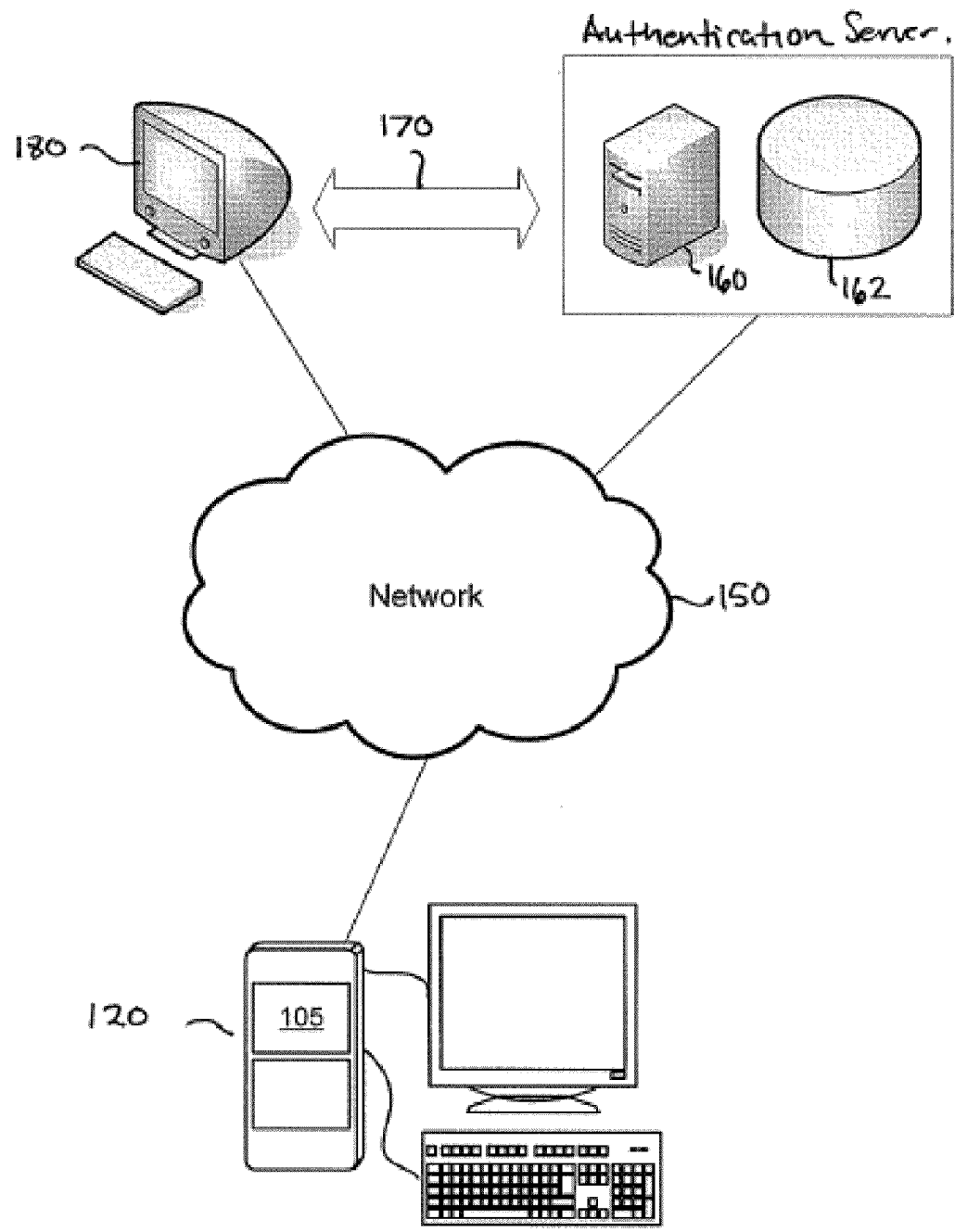
FIG. 1 is a block diagram of a system for auditing software usage on a client device in accordance with one embodiment of the invention.

FIG. 1 illustrates an authorization server 160 associated with a database 162 which receives audit data from the client device 120 relating to the use of software 105. An access device 180 communicates with the authorization server 160 through a separate communication link 170 or through the network 150 to enable queries of the database 162.

The client device 120 may be any machine or device capable of communication with a network, such as a game console, a personal computer, a server computer, a laptop computer, a tablet computer, a personal digital assistant, a mobile phone, a wireless communication device, an onboard vehicle computer, and the like. While a single client device 120 is shown, the authorization server 160 is configured to establish communication links with multiple client devices so that audit data from each client device 120 can be received and recorded, thus enabling auditing of the software within substantially the entire market for that software.

The executable software 105 is operable by the client device 120 and includes a routine which performs a check to see if a license is granted for the software 105 to run on the client device 120. This is typically done by storing a license or unlock key on the client device 120 which the software 105 uses to verify the license.

If the license key is present, then the license key is compared to the unique hardware configuration of the client device 120. If the hardware identity has not changed, the software or the restricted portions thereof are allowed to continue to run.

On the other hand, if the license key is not present or the hardware identity of the client device has changed, then an authorization process is started, which requests or collects an identifier for the software (e.g., serial number) and generates a device fingerprint. The software identifier and device fingerprint are transmitted to an authorization server 160 or a separate license server, which verifies that a license is granted for the software and sends a license key to the client device 120 to unlock the software or portions thereof. The device fingerprint and license key are stored in a database 162 accessible by the authorization server 160.

The executable software 105 is further configured to initiate the generation of a covert key at predetermined or random time intervals after the unlock has taken place. In a preferred embodiment, the covert key is generated at random time intervals so as to avoid detection or observation by a user. The covert key is generated based on at least the portion of the executable software 105 that was unlocked by the license key. This covert key is associated with a device fingerprint stored in the client device 120 or generated contemporaneously with the covert key. The covert key and device fingerprint pair are then sent to the authorization server 160.

The authorization server 160 accesses a database 162 having stored thereon a plurality of previously received device fingerprints associated with license keys. The authorization server 160 determines whether the device fingerprint associated with the covert key corresponds to any one of the plurality of previously received device fingerprints associated with the license keys. Unauthorized software usage at a client device 120 is determined at least when a covert key is not found to correspond to a device fingerprint having an associated license key. Thus if a covert key/device fingerprint pair exists without a license key/device fingerprint pair, where the device fingerprints are the same, this can be considered a pirated activation because the unlocked portion of the software code was executed without the license key code having been executed.

It is understood that the device fingerprint is generated based on information regarding client device 120 by checking a number of parameters which, collectively, are expected to uniquely identify client device 120. The description below presumes that the software includes a routine which generates the device fingerprint.

The parameters checked may include, for example, hard disk volume name, user name, device name, user password, hard disk initialization date, etc. The collected information includes information that identifies the hardware on which the software is used, such as, for example, CPU number, or unique parameters associated with the firmware in use. The system information may further include system configuration information, such as amount of memory, type of processor, software or operating system serial number, etc. The parameters checked may also include, alternatively or in addition, virtual machine specifications. Examples of virtual machine specifications include, but are not limited to, information relating to virtual processors, virtual BIOS, virtual memory, virtual graphics, virtual IDE drives, virtual SCSI devices, virtual PCI slots, virtual floppy drives, virtual serial (COM) ports, virtual parallel (LPT) ports, virtual keyboard, virtual mouse and drawing tablets, virtual Ethernet card, virtual networking, virtual sound adapter, etc.

Based on the collected information, the routine generates a device fingerprint that uniquely identifies the user's computer. The device fingerprint may be stored in a hidden directory of the device, and/or it may be generated each time a user event occurs, or at any other desired time. The device fingerprint, by virtue of the software being used on the client device 120 or otherwise having access to the client device 120 hardware and file system, is generated by a process which operates on data indicative of the client device 120 configuration and hardware.

The device fingerprint may be generated using a combination of user-configurable and non-user-configurable machine parameters as input to a process that results in the device fingerprint, which may be expressed in digital data as a binary number. Each machine parameter is data determined by a hardware component, software component, or data component specific to the device that the unique identifier pertains to. Machine parameters may be selected based on the target device system configuration such that the resulting device fingerprint has a very high probability (e.g., greater than 99.999%) of being unique to the target device. In addition, the machine parameters may be selected such that the device fingerprint includes at least a stable unique portion up to and including the entire identifier, which has a very high probability of remaining unchanged during normal operation of the target device. Thus, the resulting device fingerprint should be highly specific, unique, reproducible and stable as a result of properly selecting the machine parameters.

The software routine that generates the device fingerprint may also operate on the collected parameters with one or more algorithms to generate the device fingerprint. This process may include at least one irreversible transformation, such as, for example, a cryptographic hash function, such that the input machine parameters cannot be derived from the resulting device fingerprint. Each device fingerprint, to a very high degree of certainty, cannot be generated except by the suitably configured device fingerprint routine operating or otherwise having had access to the same client device 120 for which the device fingerprint was first generated. Conversely, each identifier, again to a very high degree of certainty, can be successfully reproduced by the suitably configured device fingerprint routine operating or otherwise having access to the same client device 120 on which the identifier was first generated.

The device fingerprint routine may operate by performing a system scan to determine a present configuration of the client device 120. The routine may then select the machine parameters to be used as input for generating the unique device fingerprint. Selection of parameters may vary depending on the system configuration. Once the parameters are selected, the routine may generate the identifier.

Further, generating the device fingerprint may also be described as generating a device fingerprint and may entail the sampling of physical, non-user configurable properties as well as a variety of additional parameters such as uniquely generated hashes and time sensitive values. Physical device parameters available for sampling may include, for example, unique manufacturer characteristics, carbon and silicone degradation and small device failures.

The process of measuring carbon and silicone degradation may be accomplished by measuring a chip's ability to process complex mathematical computations, and its ability to respond to intensive time variable computations. These processes measure how fast electricity travels through the carbon. Using variable offsets to compensate for factors such as heat and additional stresses placed on a chip during the sampling process allows for each and every benchmark to reproduce the expected values. During a standard operating lifetime, the process of passing electricity through the various switches causes a computer chip to degrade. These degradations manifest as gradually slower speeds that extend the processing time required to compute various benchmarking algorithms.

In addition to the chip benchmarking and degradation measurements, the process for generating a device fingerprint may include measuring physical, non-user-configurable characteristics of disk drives and solid state memory devices. Each data storage device has a large variety of damage and unusable data sectors that are nearly unique to each physical unit. The ability to measure and compare values for damaged sectors and data storage failures provides a method for identifying storage devices.

Device parameter sampling, damage measurement and chip benchmarking make up just a part of device fingerprinting technologies described herein. These tools may be further extended by the use of complex encryption algorithms to convolute the device fingerprint values during transmission and comparisons. Such encryption processes may be used in conjunction with random sampling and key generations.

The device fingerprint may be generated by utilizing machine parameters associated with one or more of the following: machine model; machine serial number; machine copyright; machine ROM version; machine bus speed; machine details; machine manufacturer; machine ROM release date; machine ROM size; machine UUID; and machine service tag.

The device fingerprint may also be generated by utilizing machine parameters associated with one or more of the following: CPU ID; CPU model; CPU details; CPU actual speed; CPU family; CPU manufacturer; CPU voltage; and CPU external clock.

The device fingerprint may also be generated by utilizing machine parameters associated with one or more of the following: memory model; memory slots; memory total; and memory details.

The device fingerprint may also be generated by utilizing machine parameters associated with one or more of the following: video model; video details; display model; display details; audio model; and audio details.

The device fingerprint may also be generated by utilizing machine parameters associated with one or more of the following: network model; network address; Bluetooth address; BlackBox model; BlackBox serial; BlackBox details; BlackBox damage map; BlackBox volume name; NetStore details; and NetStore volume name.

The device fingerprint may also be generated by utilizing machine parameters associated with one or more of the following: optical model; optical serial; optical details; keyboard model; keyboard details; mouse model; mouse details; printer details; and scanner details.

The device fingerprint may also be generated by utilizing machine parameters associated with one or more of the following: baseboard manufacturer; baseboard product name; baseboard version; baseboard serial number; and baseboard asset tag.

The device fingerprint may also be generated by utilizing machine parameters associated with one or more of the following: chassis manufacturer; chassis type; chassis version; and chassis serial number.

The device fingerprint may also be generated by utilizing machine parameters associated with one or more of the following: IDE controller; SATA controller; RAID controller; and SCSI controller.

The device fingerprint may also be generated by utilizing machine parameters associated with one or more of the following: port connector designator; port connector type; port connector port type; and system slot type.

The device fingerprint may also be generated by utilizing machine parameters associated with one or more of the following: cache level; cache size; cache max size; cache SRAM type; and cache error correction type.

The device fingerprint may also be generated by utilizing machine parameters associated with one or more of the following: fan; PCMCIA; modem; portable battery; tape drive; USB controller; and USB hub.

The device fingerprint may also be generated by utilizing machine parameters associated with one or more of the following: device model; device model IMEI; device model IMSI; and device model LCD.

The device fingerprint may also be generated by utilizing machine parameters associated with one or more of the following: wireless 802.11; webcam; game controller; silicone serial; and PCI controller.

In one example, the device fingerprint may also be generated by utilizing machine parameters associated with one or more of the following: machine model, processor model, processor details, processor speed, memory model, memory total, network model of each Ethernet interface, network MAC address of each Ethernet interface, BlackBox Model, BlackBox Serial (e.g., using Dallas Silicone Serial DS-2401 chipset or the like), OS install date, nonce value, and nonce time of day.

Figure 2:
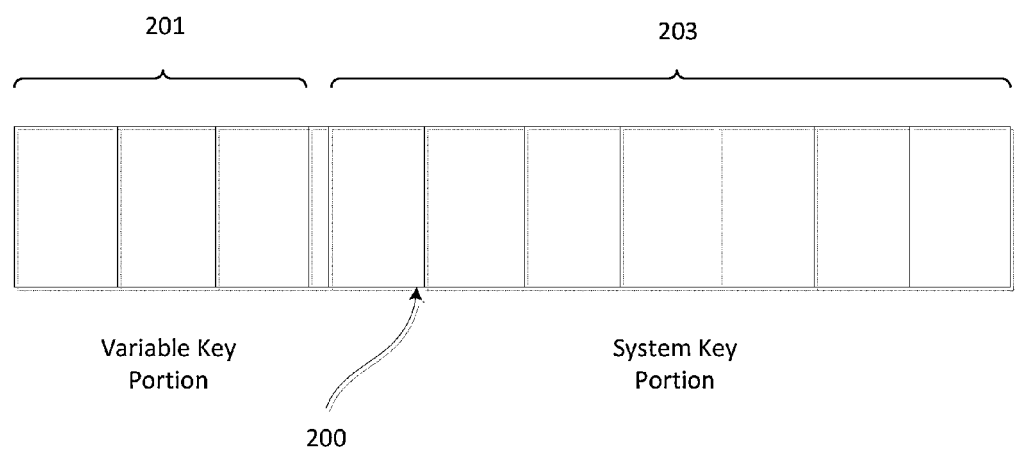
FIG. 2 is a block diagram showing memory allocation for a device fingerprint used in accordance with the invention.

FIG. 2 illustrates an exemplary embodiment of a device fingerprint 200, which may include two components—namely, a variable key portion 201 and a system key portion 203. The variable key portion 201 may be generated by reference to a variable platform parameter, such as via reference to system time information, although other parameters which are variable may be utilized in other embodiments. The system key portion 203 may include the above described parameters expected to be unique to the client device 120 on which the software is used, such as, for example, hard disk volume name, user name, computer name, user password, hard disk initialization date, or combinations of the parameters described above. The variable key portion 201 and/or the system key portion 203 may be combined with the IP address and/or other platform parameters of the client device 120. The device fingerprint, or portions thereof, may be encrypted to add an additional layer of specificity and security.

Figure 3:
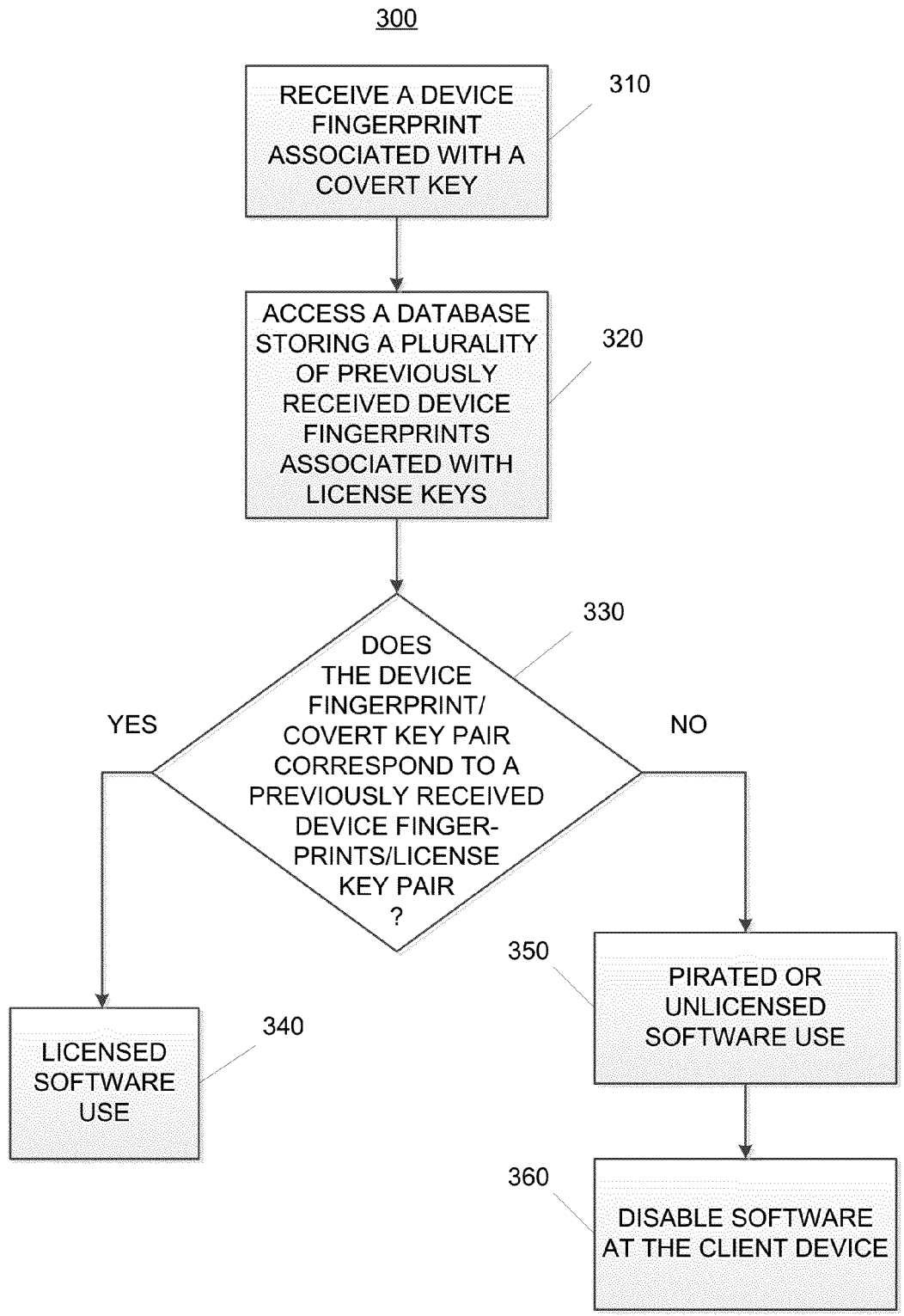
FIG. 3 is a flowchart illustrating a software process for collection of audit data according to another embodiment of the invention.

FIG. 3 is a flowchart illustrating a software process 300 for collection of audit data. At 310, a device fingerprint and an associated covert key are received at an authentication server from a client device operating software. As described above in relation to FIG. 1, the covert key is generated based on unlocked portions of licensed software. Thus, the fact that a covert key is received from a client device indicates that unlocked software is being used at the client device.

At 320, the authentication server accesses a database that has stored thereon a plurality of previously received device fingerprints associated with license keys. The device fingerprints associated with license keys correspond to those client devices which are authorized to install/use unlocked versions of the software.

At 330, a determination is made as to whether the device fingerprint associated with the covert key corresponds to one of the plurality of previously received device fingerprints associated with license keys. If so, then at 340, a determination is made the client device is licensed to use the software. On the other hand, if the device fingerprint associated with the covert key does not correspond to any one of the plurality of previously received device fingerprint associated with license keys, then at 350, a determination is made that the software use is either pirated or unlicensed. At 360, disable key may be sent to the client device so as to disable use of the software or the unlocked portions of the software.

Figure 4:
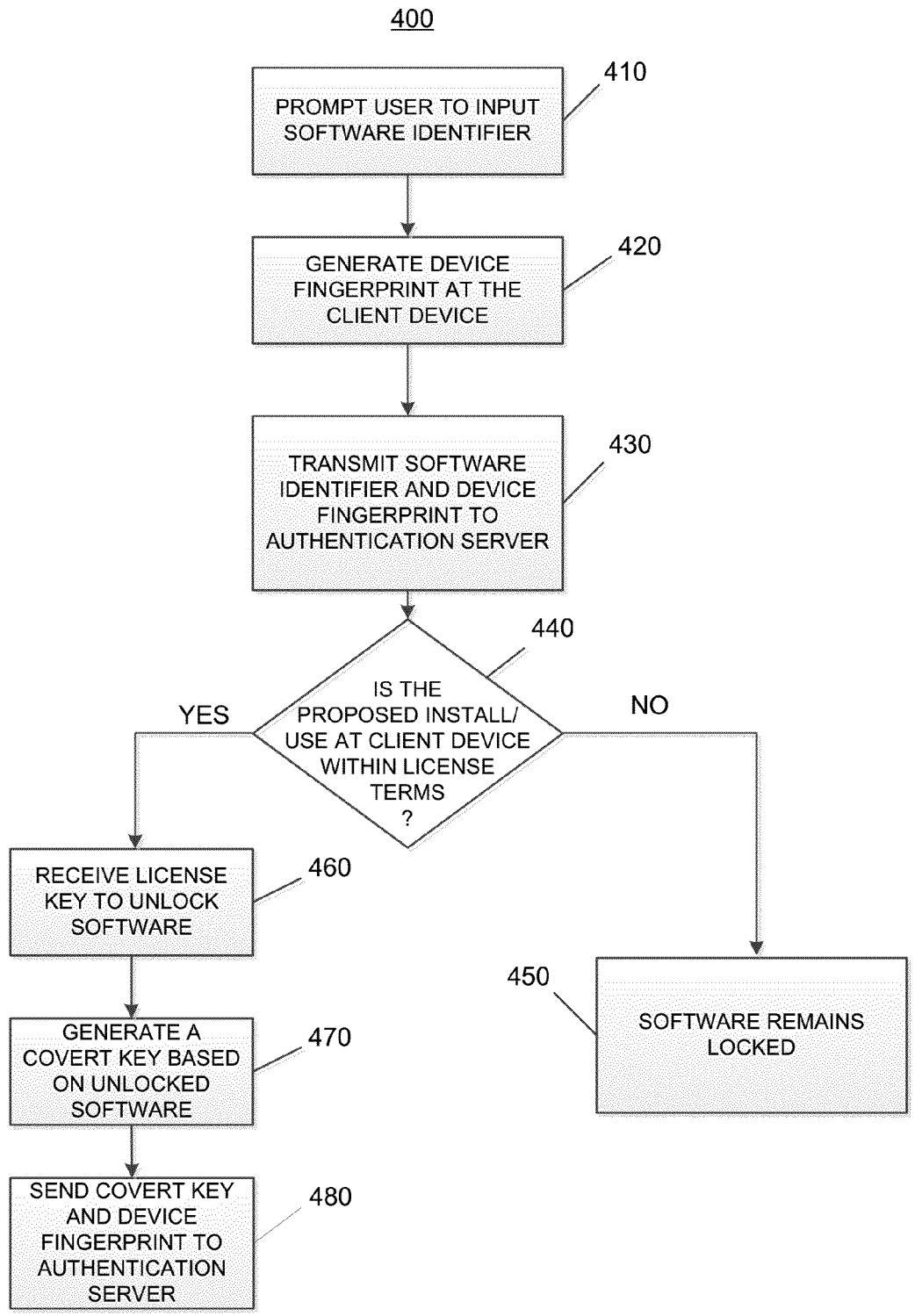
FIG. 4 is a flow chart illustrating a software process at a client device according to another embodiment of the invention.

FIG. 4 is a flow chart illustrating a software process 400 occurring at a client device. At 410, the user is prompted to input a software identifier, such as a serial number. At 420, a device fingerprint is generated in accordance with the methods describe above in connection with FIGS. 1-2.

At 430, the software identifier and device fingerprint are transmitted via a network connection to an authentication server. The authentication server then performs the appropriate checks to determine whether the installation or use of the software at the client device is authorized under the appropriate license.

At 440, a determination is made as to whether the proposed installation or use of the software at the client device is within license terms. If not, at 450, the software remains locked. If the use of the software at the client device is properly licensed, then, at 460, a license key is received at the client device. The license key is essentially unlocks the entire or restricted portions of the software.

At some time interval subsequent to receiving the license key, the software operating at the client device operates a covert key routine and, at 470, generates a covert key based on the unlocked software. At 480, the covert key and device fingerprint are sent to the authentication server and the steps as described in relation to FIG. 3 are then performed at the authentication server.

Thus, a system and a method for auditing software usage on a client device are disclosed. While embodiments of this invention have been shown and described, it will be apparent to those skilled in the art that many more modifications are possible without departing from the inventive concepts herein. The invention, therefore, is not to be restricted except in the spirit of the following claims.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a client device and the client device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

It is understood that the specific order or hierarchy of steps in the processes disclosed herein in an example of exemplary approaches. Based upon design preferences, it is understood that the specific order or hierarchy of steps in the processes may be rearranged while remaining within the scope of the present disclosure. The accompanying method claims present elements of the various steps in sample order, and are not meant to be limited to the specific order or hierarchy presented.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical discs (e.g., compact disc (CD), digital versatile disc (DVD), etc.), smart cards, and flash memory devices (e.g., Erasable Programmable Read Only Memory (EPROM), card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

What is claimed is:

1. A system for auditing usage of software comprising:
a network interface disposed to receive a device fingerprint associated with a covert key, the covert key derived based on a portion of the software that was unlocked by a license key;
a memory holding program instructions operable for accessing a database storing a plurality of previously received device fingerprints associated with license keys and determining whether the device fingerprint associated with the covert key corresponds to any one of the plurality of previously received device fingerprints associated with license keys; and a processor, in communication with the network interface and the memory, the processor configured for operating the program instructions.

2. A method for auditing usage of software comprising:

receiving, by a processor, a device fingerprint associated with a covert key from a client device, the covert key derived based on a portion of the software that was unlocked by a license key on the client device;

accessing, by the processor, a database storing a plurality of previously received device fingerprints associated with license keys; and determining whether the device fingerprint associated with the covert key corresponds to any one of the plurality of previously received device fingerprints associated with license keys.

3. The method of claim 2, wherein the license keys each indicate unlock of at least a portion of software operating at a client device.

4. The method of claim 2, further comprising indicating that unlicensed software usage has taken place upon determining that the device fingerprint associated with the covert key does not correspond to any one of the plurality of previously received device fingerprints associated with license keys.

5. The method of claim 4, further comprising transmitting a disable key configured to prevent further use of the software at the client device originating the device fingerprint associated with the covert key.

6. A method for auditing software usage at a client device comprising:

sending, from a client device, an identifier for the software installed on the client device and a device fingerprint uniquely identifying the client device;

receiving at the client device, a license key operable to unlock at least a portion of the software, for use at the client device;

generating a covert key based on at least the portion of the software unlocked by the license key; and sending, from the client device, the covert key and the device fingerprint.

7. The method of claim 6, wherein generating the covert key is performed at a random time interval after the first sending step.

8. The method of claim 6, wherein generating the covert key is performed at a random percent chance basis after the first sending step.

9. The method of claim 6, wherein the identifier for the software is a serial number.

10. The method of claim 6, further comprising generating the device fingerprint based at least in part on a combination of at least one user-configurable parameter and at least one non-user configurable parameter.

* * * * *